(No Model.) 2 Sheets—Sheet 1.
W. MARSHALL.
TELEPHONIC CIRCUIT.
No. 349,312. Patented Sept. 21, 1886.
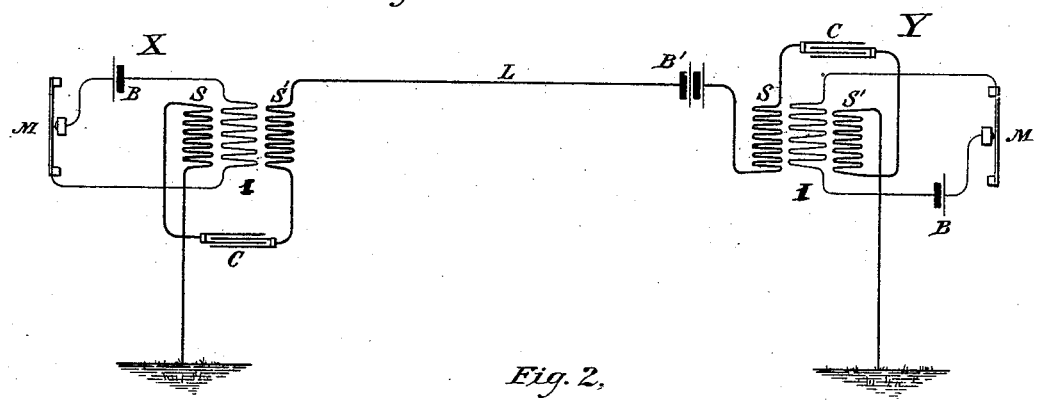
Fig. 1.
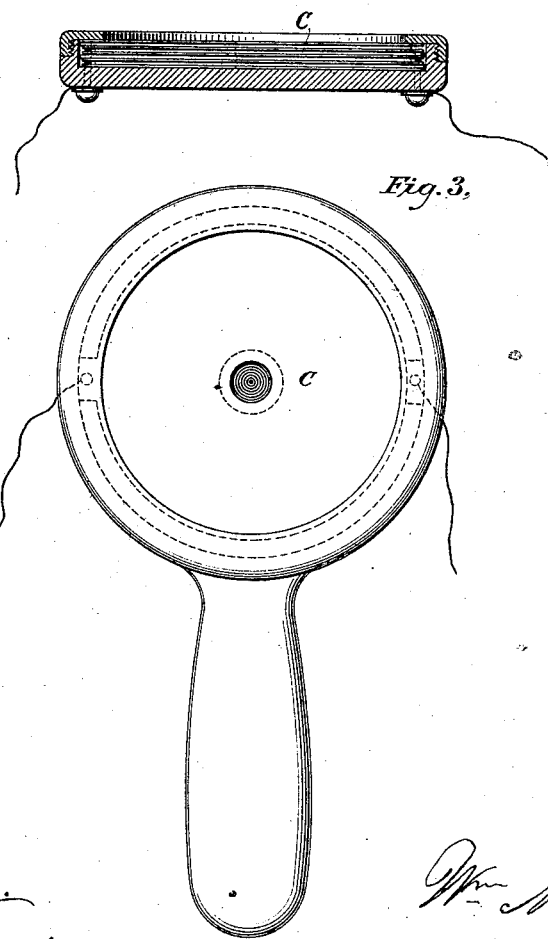
Fig. 2.
Fig. 3.
Witnesses
Geo. W. Breck.
Ulysses W. Cook.
Inventor
Wm Marshall (No Model.)
2 Sheets—Sheet 2.

W. MARSHALL.
TELEPHONIC CIRCUIT.

No. 349,312. Patented Sept. 21, 1886.

Witnesses
Geo. W. Breck.
Ulysses W. Cook.

Inventor
Wm Marshall

UNITED STATES PATENT OFFICE.

WILLIAM MARSHALL, OF NEW YORK, N. Y.

TELEPHONIC CIRCUIT.

SPECIFICATION forming part of Letters Patent No. 349,312, dated September 21, 1886, Application filed October 15, 1885. Serial No. 179,982. (No model.)

*To all whom it may concern:*

Be it known that I, WILLIAM MARSHALL, a citizen of the United States, residing in the city, county, and State of New York, have invented certain new and useful Improvements in Telephonic Circuits and Receiving Speaking-Telephones, of which the following is a specification.

This invention relates to telephonic systems.
The prime object of the invention is to produce a telephonic system with speaking-condensers in which a more perfect transmission of the volume of speech can be accomplished than has been possible heretofore in systems of this kind.

The invention consists, essentially, in a telephonic system comprising speaking-condensers and an induction-coil at each station, each induction-coil having two secondary wires and a primary wire, and the opposite ends of each secondary wire being connected to the opposite poles of the speaking-condensers.

Furthermore, the invention consists in various novel details of construction whereby the object of the invention is attained, as will be clearly hereinafter set forth.

Figure 4:
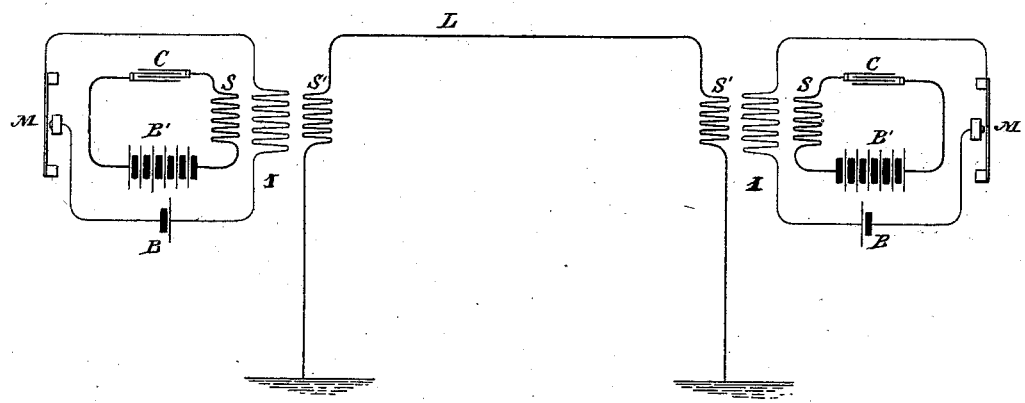
Figure 5:
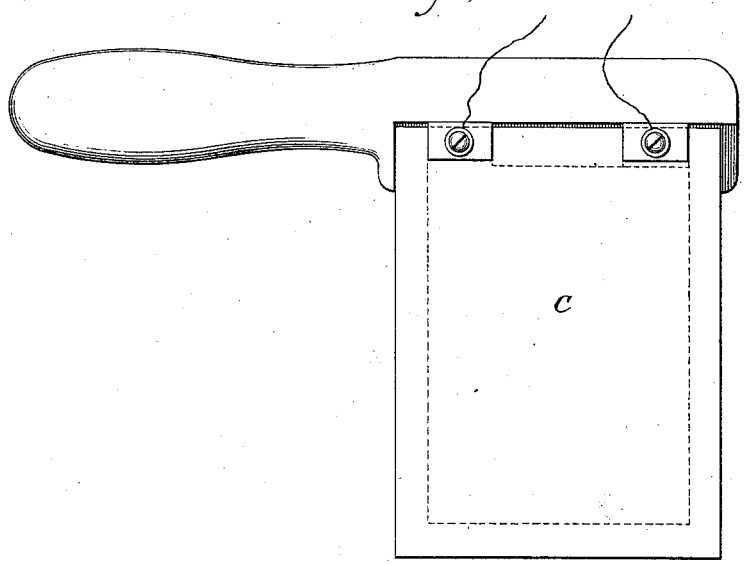

In the accompanying drawings, Figure 1 is a diagram representing a telephonic circuit connecting two stations each with its transmitting devices and receiving - telephones. Fig. 2 is a cross-section of the receiving-telephone. Fig. 3 shows the telephone incased in the sounding-box with its electrical connections. Fig. 4 shows another system of circuits in which the receiving-telephone is placed in a local circuit. Fig. 5 represents the receiving-telephone formed in the shape of a book, having its leaves connected at one extremity only and leaving the other ends loose, as shown in cross-section, Fig. 6.

Similar letters indicate the same parts in the several figures.

In an application for Letters Patent filed February 6, 1885, allowed May 29, 1885, and patented May 4, 1886, No. 341,259, I have described a receiving speaking-condenser telephone the opposite poles of which are connected with a line-wire and a shunt or resistance coil. In this invention, however, I connect the condenser-plates at either pole with the opposite side of two secondary wires of an induction-coil; or I insert the receiving-telephone in a local circuit containing a polarizing-battery, as hereinafter described, and specially shown in Fig. 4 of the drawings.

It has been claimed that a condenser can be made to speak; but I have discovered that unless the line-wire connecting the stations is made continuous, as by shunting the speaking-condenser, or by the method described in this application, the articulation and volume of speech are not perfect, being scarcely audible when more than one speaking-condenser are inserted in the line of communication.

Figure 6:
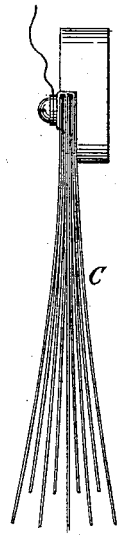

In the diagram represented in Fig. 1 the poles of the speaking-condensers C C are connected with the opposite ends of the secondary wires S S' of the induction-coil I, the primary of which includes the battery B and microphone-transmitter M. The line-wire has in circuit the battery B', which polarizes the speaking-condensers C C. When the microphone M at station Y is spoken to, the current induced into the line reaches the induction-wire S' at station X, changing the polarization of the plates of the condenser C, with which it is in contact, directly, and the opposite plates of the same condenser inductively, with the same direction of current through the other secondary wire, S. With this organization of circuit the opposite plates of the condenser vibrate in unison and with much greater force, as will be readily understood. The condensers C C speak much louder when the metallic plates are in part not touching or in contact with the insulator, allowing a space sufficient to vibrate freely and impart to the air the sound which is transmitted from a distant station, so as to be easily heard. In fact, the speaking-condenser should be built up in the same manner as if the leaves of electrometers were intersected into each other, substantially as shown in Fig. 6, one end only of the plates being fastened. In Fig. 3 the middle of the plates are made loose by pressing the circumference together, the plates and insulators bulging sufficiently in the center to separate themselves. In Fig. 4 another organization of circuit is shown, wherein the polarizing-battery for the condenser is placed in a local circuit, instead of being placed in the line-wire. The induction-coil has two secondary wires, as that shown in Fig. 1. The current induced into the line by the action of the microphone affects the speaking-condenser inductively through the two secondary wires of the induction-coil.

The two methods of circuit shown in Figs. 1 and 4 can be combined, if desired, by organizing one station as shown in Fig. 1 and the other station as shown in Fig. 4; or one of the speaking-condensers may be placed directly on the line-wire, the line having its polarizing-battery, and the other speaking-condenser placed in a local circuit, as shown in Fig. 4.

Having described my invention, what I claim, and desire to secure by Letters Patent of the United States, is—

1. In a telephonic system with speaking-condensers, an induction-coil at each station, said induction-coil having two secondary wires and a primary wire, the opposite ends of each secondary wire being connected to the opposite poles of the speaking-condenser, for the purpose substantially as described.

2. In a telephonic system, the within-described induction-coil, having two secondary wires and a primary wire, one of the secondary wires being connected with a speaking-condenser and the other with the line-wire and a polarizing-battery, substantially as and for the purpose described.

3. In a telephonic system, the within-described induction-coil, having two secondary wires and a primary wire, the primary wire being connected with the microphone M and the battery B, substantially as and for the purpose described.

4. A speaking-condenser the opposite plates of which are loose, except at one end, and formed as intersected electrometers, the electrodes having independent connections, substantially as described and shown.

New York, October 7, 1885.

WM. MARSHALL.

Witnesses:
THOS. H. FLAHERTY,
O. W. OZIOZUGON.